United States Patent [19]

Beffa et al.

[11] Patent Number: 4,710,198

[45] Date of Patent: Dec. 1, 1987

[54] 1:2 CHROMIUM OR COBALT METAL COMPLEX DYES AND USE THEREOF FOR DYEING LEATHER

[75] Inventors: Fabio Beffa, Riehen; Hans U. Schütz, Basel, both of Switzerland

[73] Assignee: Ciba-Geigy Corporation, Ardsley, N.Y.

[21] Appl. No.: 806,871

[22] Filed: Dec. 9, 1985

[30] Foreign Application Priority Data

Dec. 17, 1984 [CH] Switzerland ............... 5995/84

[51] Int. Cl.$^4$ ............... C09B 29/30; C09B 45/14; D06P 1/10; D06P 3/24
[52] U.S. Cl. ............... 8/437; 8/94.1 R; 8/94.27; 8/436; 8/682; 8/685; 8/917; 8/924; 534/696; 534/721; 534/723; 534/725; 534/692
[58] Field of Search ............... 8/437, 682, 685

[56] References Cited

U.S. PATENT DOCUMENTS

| | | | |
|---|---|---|---|
| 1,833,237 | 11/1931 | Straub et al. | 534/725 |
| 1,865,978 | 7/1932 | Straub et al. | 534/725 |
| 1,888,516 | 11/1932 | Straub et al. | 534/723 X |
| 2,074,225 | 3/1937 | Krebser | 534/721 |
| 2,268,936 | 1/1942 | Hasler et al. | 534/723 |
| 2,804,454 | 8/1957 | Beffa | 534/721 |
| 3,879,336 | 4/1975 | Maeda et al. | 534/693 |
| 4,150,942 | 4/1979 | Holliger et al. | 8/658 |

FOREIGN PATENT DOCUMENTS

| | | |
|---|---|---|
| 95441 | 11/1983 | European Pat. Off. |
| 51-129495 | 11/1976 | Japan |
| 55-060562 | 5/1980 | Japan |
| 57-073052 | 5/1982 | Japan |
| 2158085 | 11/1985 | United Kingdom |

Primary Examiner—A. Lionel Clingman

Attorney, Agent, or Firm—Edward McC. Roberts; Meredith C. Findlay

[57] ABSTRACT

A process of dyeing polyamide-containing material is disclosed using dyes of the following formula:

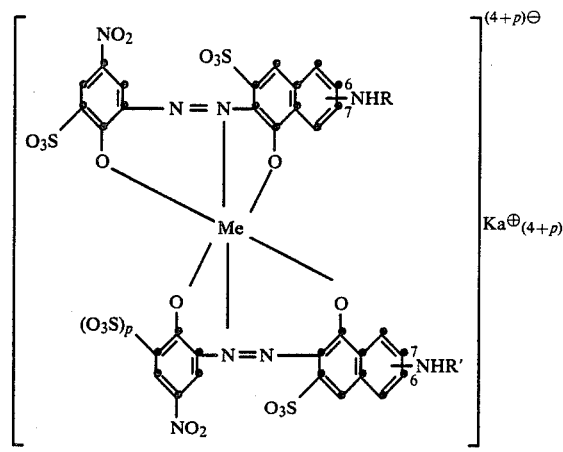

wherein
Me is cobalt or chromium,
$Ka^\oplus$ is a cation,
p is 0 or 1,
R and R' are each independently of the other hydrogen or a group of the formula $-CO-(O)_n-Y$, where n is 0 or 1, and
Y is $C_1-C_5$alkyl, or phenyl which may be substituted by nitro, halogen, $C_1-C_5$alkyl or $C_1-C_5$alkoxy,
with the proviso that R and R' may not both be hydrogen if p is 1.

Novel dyes within this class are also disclosed. The process is especially useful for dyeing leather.

9 Claims, No Drawings

1:2 CHROMIUM OR COBALT METAL COMPLEX DYES AND USE THEREOF FOR DYEING LEATHER

The present invention relates to the use of dyes of formula I

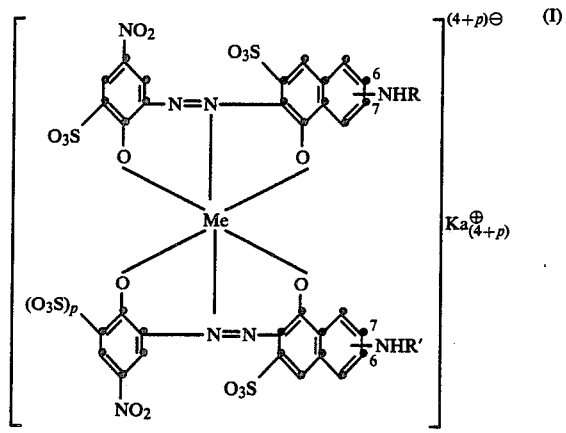

wherein
M is cobalt or chromium,
$Ka^\oplus$ is a cation,
p is 0 or 1,
R and R' are each independently of the other hydrogen or a group of the formula $-CO-(O)_n-Y$, where
n is 0 or 1, and
Y is $C_1-C_5$alkyl, or phenyl which may be substituted by nitro, halogen, $C_1-C_5$alkyl or $C_1-C_5$alkoxy,
with the proviso that R and R' may not both be hydrogen if p is 1,
for dyeing polyamide-containing material.

$Ka^\oplus$ is a cation, for example an alkali metal cation such as lithium, potassium or, preferably, sodium. $Ka^\oplus$ may also be an ammonium cation or the ammonium salt of an organic amine.

Me is preferably chromium.

R and R' may be different but are preferably identical. Examples of suitable groups R and R' are: hydrogen, acetyl, propionyl, butyryl, isobutyryl, valeryl, isovaleryl, pivaloyl, capronyl, methoxycarbonyl, ethoxycarbonyl, propoxycarbonyl, n-pentoxycarbonyl, benzoyl or phenoxycarbonyl, in which two last mentioned groups the phenyl moieties may be substituted, e.g. by nitro, halogen such as bromine or, preferably, chlorine, or by $C_1-C_4$alkyl or $C_1-C_4$alkoxy. The preferred meanings of R and R' are: hydrogen, acetyl, propionyl, methoxycarbonyl, ethoxycarbonyl, benzoyl, nitrobenzoyl, chlorobenzoyl or phenoxycarbonyl, with hydrogen or acetyl being most preferred.

The —NHR and —NHR' groups are in position 6 or, preferably, 7.

The two azo dyes in the 1:2 cobalt or 1:2 chromium complex dyes of formula I above may be different. Preferably, however, they are identical, i.e. in formula I p is 1 and R and R' have the same meaning.

The dyes of formula I are used for dyeing polyamide-containing fibre material, e.g. silk, synthetic polyamides such as polyamide 6 or polyamide 66, wool and, in particular, furs or leather, with all types of leather being suitable, e.g. chromed leather, re-tanned leather or suède leather made of goatskin, cow-hide or pigskin. Particularly suitable dyes of formula I for dyeing wool and synthetic polyamides are those in which each of —NHR and/or —NHR' is an amino group. The dyes of formula I are especially suitable for dulling leather dyeings in multi-coloured or brown shades. For this utility the dyes are employed in amounts of about 10 to 50%, based on the total amount of dye.

The present invention also relates to the dyes of formula II

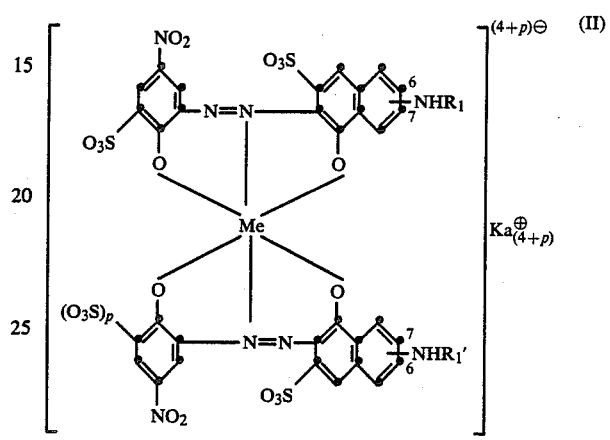

wherein
Me is cobalt or chromium,
$Ka^\oplus$ is a cation,
p is 0 or 1, and
$R_1$ and $R_1'$ are each independently of the other a group of the formula $-CO-(O)_n-Y_1$, where
n is 0 or 1 and
$Y_1$ is $C_1-C_5$alkyl or phenyl,
with the proviso that $Y_1$ may not be methyl if n is 0, and the phenyl group may be substituted by nitro, halogen, $C_1-C_5$alkyl or $C_1-C_5$alkoxy.

The present invention relates furthermore to the dyes of formula III

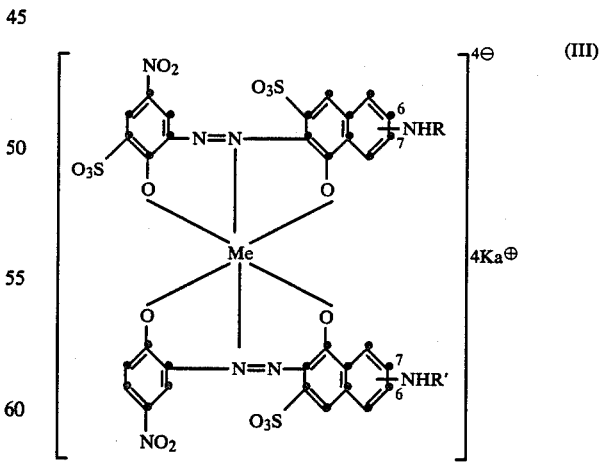

wherein Me, $Ka^\oplus$, R and R' are as defined for formula I.

The dyes of formulae I, II and III are prepared in a manner which is known per se, for example by reacting a dye of formula IV

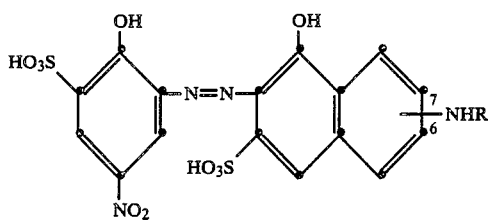

and a dye of formula V

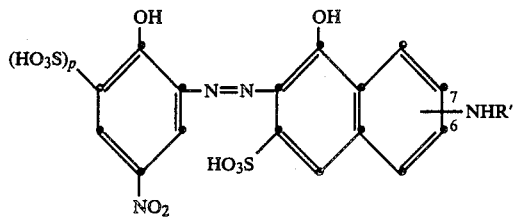

wherein R, R' and p are as defined for formula I, which dyes of formulae IV and V may be identical, with a cobalt or chromium donor to give the 1:2 metal complex.

If the dyes IV and V in the above process are different, then mixed 1:2 metal complexes are obtained, namely symmetrical complexes containing 2 molecules of the dye of formula IV or V as well as asymmetrical complexes containing one molecule of the dye of formula IV and one molecule of the dye of formula V.

The 1:2 chromium complexes can also be obtained by first preparing the 1:1 chromium complex of a dye of formula IV or of a dye of formula V and then reacting said dye with a non-metallised dye of formula V or IV to give the 1:2 chromium complex. Homogeneous asymmetrical 1:2 chromium complexes can also be obtained in this manner.

The cobalting and chroming are carried out by conventional methods. The introduction of the —CO—(O)-$_n$—Y group can be effected before or after metallising.

The metal complex dyes obtainable by the above processes are advantageously isolated in the form of their salts, preferably of their alkali metal salts such as lithium or potassium salts, but most preferably of their sodium salts or also ammonium salts.

The invention is illustrated by the following non-limitative Examples, in which parts and percentages are by weight. The temperatures are given in centigrades.

EXAMPLE 1

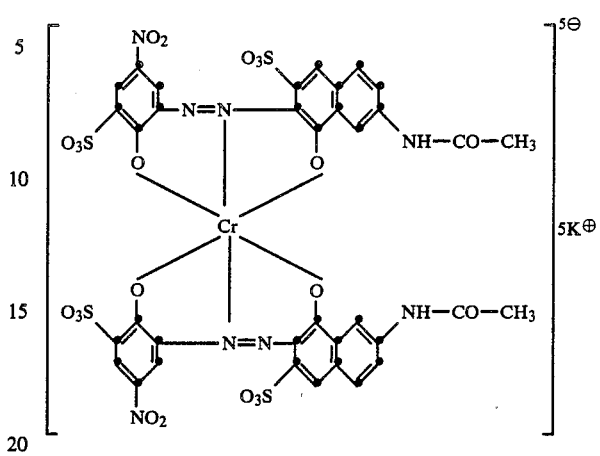

52.6 parts of the monoazo dye obtained by coupling diazotised 4-nitro-2-amino-1-hydroxybenzene-6-sulfonic acid with 2-acetylamino-8-hydroxynaphthalene-6-sulfonic acid are stirred in 400 parts by volume of water and, upon addition of 150 parts by volume of a solution of sodium chromium salicylate (corresponding to 3.12 parts of chromium), the reaction mixture is refluxed until the starting dye can no longer be detected. When chroming is complete, the chromium-containing dye is precipitated with potassium chloride, isolated by filtration, and dried. The resultant black powder forms a grey solution in water and dyes leather in very fast grey shades.

EXAMPLE 2

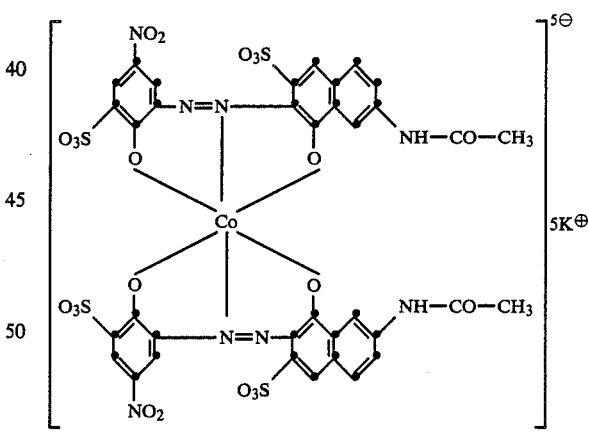

52.6 parts of the dye obtained by coupling diazotised 4-nitro-2-amino-1-hydroxybenzene-6-sulfonic acid with 2-acetylamino-8-hydroxynaphthalene-6-sulfonic acid are stirred at 80°–90° C. in 400 parts by volume of water with a solution of cobalt sulfate (corresponding to 3.54 parts of cobalt), which has been made weakly alkaline with sodium hydroxide in the presence of 14.1 parts of Seignette salt, until the starting dye can no longer be detected. When complexing is complete, the cobalt-containing dye is precipitated with potassium chloride, isolated by filtration, and dried. The resultant powder forms a brownish violet solution in water and dyes leather in very fast brownish violet shades.

EXAMPLE 3

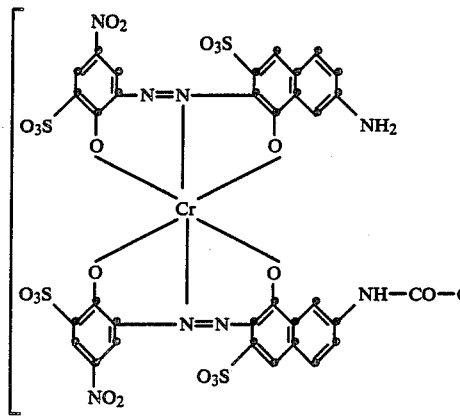

The 1:1 chromium complex containing 24.2 parts of the monoazo dye obtained by coupling diazotised 4-nitro-2-amino-1-hydroxybenzene-6-sulfonic acid with 2-amino-8-hydroxynaphthalene-6-sulfonic acid and 2.6 parts of chromium is charged into 300 parts by volume of water. Then 26.3 parts of the monoazo dye obtained by coupling diazotised 4-nitro-2-amino-1-hydroxybenzene-6-sulfonic acid with 2-acetylamino-8-hydroxynaphthalene-6-sulfonic acid are added and the reaction mixture is kept, with efficient stirring, at pH 6.5–7.5 and 80°–85° C. until the formation of the 1:2 chromium complex is complete. Water is subsequently removed by evaporation or spray drying. The black powder obtained forms a grey solution in water and dyes leather in very lightfast grey shades.

EXAMPLE 4

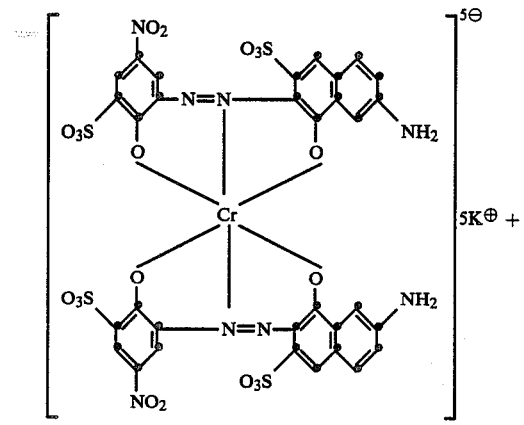

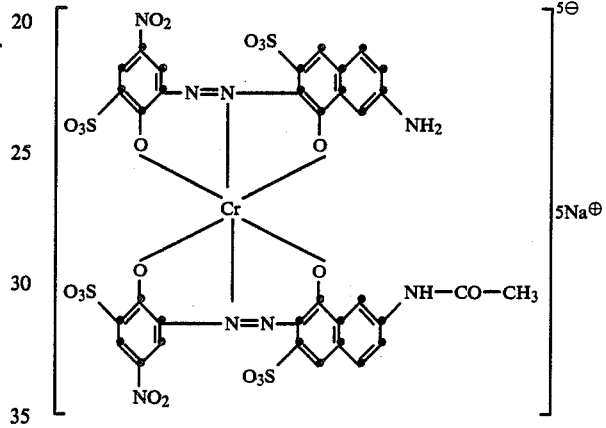

26.3 parts of the monoazo dye obtained by coupling diazotised 4-nitro-2-amino-1-hydroxybenzene-6-sulfonic acid with 2-acetylamino-8-hydroxynaphthalene-6-sulfonic acid, and 24.2 parts of the monoazo dye obtained by coupling diazotised 4-nitro-2-amino-1-hydroxybenzene-6-sulfonic acid with 2-amino-8-hydroxynaphthalene-6-sulfonic acid, are stirred in 400 parts by volume of water and, upon addition of 150 parts by volume of a solution of sodium chromium salicylate (corresponding to 3.12 parts of chromium), the reaction mixture is refluxed until the starting dyes can no longer be detected. When chroming is complete, the resultant mixture of chromium-containing dyes is precipitated by addition of potassium chloride, isolated by filtration, and dried. The resultant black powder forms a grey solution in water and dyes leather in fast grey shades.

EXAMPLES 5–19

1:2 Chromium complexes which dye leather in greyish blue to grey shades are obtained by carrying out the procedures described in Examples 1 to 4, but using the monoazo dyes listed in the following Table.

TABLE

| No. | I | II |
|---|---|---|
| 5 | (structure) | (structure) |

TABLE-continued

| No. | I | II |
|---|---|---|
| 6 | " | 3-HO₃S-2-OH-5-NO₂-phenyl–N=N–(1-OH-2-HO₃S-6-NHCOOC₂H₅-naphthyl) |
| 7 | " | 3-HO₃S-2-OH-5-NO₂-phenyl–N=N–(1-OH-2-HO₃S-6-NHCOCH₂CH₃-naphthyl) |
| 8 | 3-HO₃S-2-OH-5-NO₂-phenyl–N=N–(1-OH-2-HO₃S-6-NHCOOCH₃-naphthyl) | 3-HO₃S-2-OH-5-NO₂-phenyl–N=N–(1-OH-2-HO₃S-6-NHCOOCH₃-naphthyl) |
| 9 | 3-HO₃S-2-OH-5-NO₂-phenyl–N=N–(1-OH-2-HO₃S-6-NH₂-naphthyl) | 3-HO₃S-2-OH-5-NO₂-phenyl–N=N–(1-OH-2-HO₃S-6-NHCO-phenyl-naphthyl) |
| 10 | " | 3-HO₃S-2-OH-5-NO₂-phenyl–N=N–(1-OH-2-HO₃S-6-NHCO-(4-NO₂-phenyl)-naphthyl) |
| 11 | " | 3-HO₃S-2-OH-5-NO₂-phenyl–N=N–(1-OH-2-HO₃S-6-NHCO-(2-Cl-phenyl)-naphthyl) |
| 12 | " | 2-OH-5-NO₂-phenyl–N=N–(1-OH-2-HO₃S-6-NH₂-naphthyl) |
| 13 | " | 2-OH-5-NO₂-phenyl–N=N–(1-OH-2-HO₃S-6-NHCOCH₃-naphthyl) |
| 14 | " | 2-OH-5-NO₂-phenyl–N=N–(1-OH-2-HO₃S-6-NHCOOCH₃-naphthyl) |

TABLE-continued

| No. | I | II |
|-----|---|-----|
| 15 | " | HO₃S-, OH, N=N, OH, NH—CO—CH₃, HO₃S, NO₂ |
| 16 | " | HO₃S, OH, N=N, OH, NH—COO—(phenyl), HO₃S, NO₂ |
| 17 | HO₃S, OH, N=N, OH, NH₂, HO₃S, NO₂ | HO₃S, OH, N=N, OH, NH₂, HO₃S, NO₂ |
| 18 | " | OH, N=N, OH, NH₂, HO₃S, NO₂ |
| 19 | HO₃S, OH, N=N, OH, NH—CO—CH₃, HO₃S, NO₂ | OH, N=N, OH, NH—COCH₃, HO₃S, NO₂ |

EXAMPLE 20

Dyeing Procedure for Leather 100 parts of neutralised, chrome-tanned leather are dyed at 50° C. with 0.5 part of the dye of Example 3 in 500 parts of water. After 30 minutes, 3 parts of a synthetic fatliquoring agent (mixture of alkylbenzenes, aliphatic hydrocarbons, alkanesulfonic acids and surfactants) are added to the dyebath, followed by the addition, after a further 30 minutes, of 0.5 part of 85% formic acid, diluted with 5 parts of water. After 20 minutes the leather is rinsed with water and the dyeing is fixed in conventional manner. A grey dyeing of good fastness properties is obtained.

EXAMPLE 21

100 parts of re-tanned upholstery leather which has been given an intermediate drying are soaked for 1 hour at 50° C. and at 24 rpm in a liquor consisting of 800 parts of water, 2 parts of 24% ammonia and 1 part of wetting agent based on oxalkylated acyclic alcohols. After this pretreatment, the bath is discharged and replaced by a new bath consisting of 600 parts of water of 50° C. and 1 part of 24% ammonia. After 5 minutes, 5 parts of a synthetic tanning agent based on a condensate of a urea derivative and phenolic sulfonic acids are added and treatment is continued for 20 minutes at a constant rotating speed. Then an aqueous solution containing 1.3 parts of dye No. 1 of the Table in Example 2 of German Offenlegungsschrift No. 25 40 588 and 0.25 part of the grey dye of Example 3 of the instant application are added, followed by the addition of 0.5 part of a levelling agent of the alkylamino polyglycol ether sulfate type. After a dyeing time of 90 minutes at 50° C., the bath is acidified with 2 parts of 85% formic acid and dyeing is then continued for 30 minutes. A fatliquoring agent consisting of 1.5 parts of a fatty acid/polyamide condensate and 1.5 parts of sulfited seal oil is then added to the dyebath and fatliquoring is effected for 30 minutes at unchanged temperature. The dyed and fatliquored leather is then rinsed for 10 minutes in water of 25° C. and fixed in conventional manner. The dyeing so obtained has an olive tinged brown shade, whereas a similar dyeing obtained without the grey dye of Example 2 has a strong yellowish brown shade.

What is claimed is:

1. A process of dyeing leather which comprises contacting said material with a dye of the formula

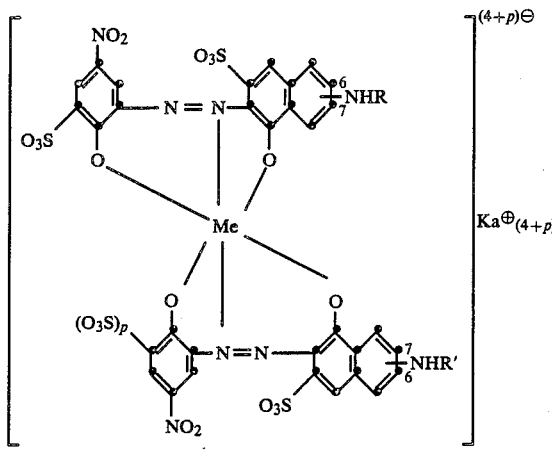

wherein
Me is cobalt or chromium,
Ka⊕ is a cation,
p is 0 or 1,
R and R' are each independently of the other hydrogen or a group of the formula —CO—(O)$_n$—Y, where
n is 0 or 1, and
Y is $C_1$–$C_5$alkyl, or phenyl which may be substituted by nitro, halogen, $C_1$–$C_5$alkyl or $C_1$–$C_5$alkoxy, with the proviso that R and R' may not both be hydrogen, —COCH$_3$ or —COC$_2$H$_5$ if p is 1.

2. A process according to claim 1 wherein Me in said dye is chromium.

3. A process according to claim 1 wherein, in said dye, each of R and R' independently of the other is hydrogen, acetyl, propionyl, methoxycarbonyl, ethoxycarbonyl, benzoyl, nitrobenzoyl, chlorobenzyl or phenoxycarbonyl.

4. A process according to claim 3 wherein each of R and $R^1$ independently of the other is hydrogen or acetyl.

5. A process according to claim 1 wherein, in said dye, the —NHR and —NHR' groups are in position 7.

6. A process according to claim 1 wherein, in said dye, the —NHR and —NHR' groups are identical and p is 1.

7. A process for dyeing and fatliquoring leather which comprises:
   a. contacting the leather to be dyed with an aqueous dye liquor containing a dye according to claim 1, a fatliquoring agent, and formic acid, the concentrations of these agents and the time and temperature of contact being sufficient to achieve dyeing with good fastness;
   b. rinsing the dyed and fatliquored leather; and
   c. fixing the dye.

8. A process according to claim 1 wherein the concentration of said dye is at least 0.25 parts.

9. A process according to claim 1 wherein said temperature of contacting is 50° C.

* * * * *